United States Patent

Wieme

[15] 3,654,946

[45] Apr. 11, 1972

[54] FLUIDIC DIODE

[72] Inventor: Andre Wieme, Zwevegem, Belgium

[73] Assignee: N.V. Bekaert S.A., Zwevegem, Belgium

[22] Filed: June 10, 1970

[21] Appl. No.: 45,020

[30] Foreign Application Priority Data

June 17, 1969 Netherlands..........................6909193

[52] U.S. Cl................................................................137/81.5
[51] Int. Cl.............................................................F15c 4/00
[58] Field of Search...................................................137/81.5

[56] References Cited

UNITED STATES PATENTS

| 3,472,256 | 10/1969 | Hartman | 137/81.5 |
| 3,472,258 | 10/1969 | Blosser, Jr. | 137/81.5 |
| 3,480,030 | 11/1969 | Bermel | 137/81.5 |
| 3,375,842 | 4/1968 | Reader | 137/81.5 |
| 3,403,563 | 10/1968 | Bowles | 137/81.5 UX |
| 3,437,100 | 4/1969 | Rona | 137/81.5 |
| 3,481,353 | 12/1969 | Hatch, Jr. | 137/81.5 |

Primary Examiner—Samuel Scott
Attorney—Sparrow and Sparrow

[57] ABSTRACT

A switch element with irreversible operation for fluid-controlled logical circuits, particularly a fluidic diode, i.e., an element the purpose of which is to allow a flow of fluid to pass between two connections in one direction, and to channel a flow which is introduced into the element in the opposite direction towards a ventilation aperture via which the fluid then escapes.

10 Claims, 5 Drawing Figures

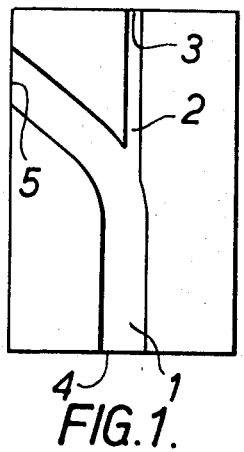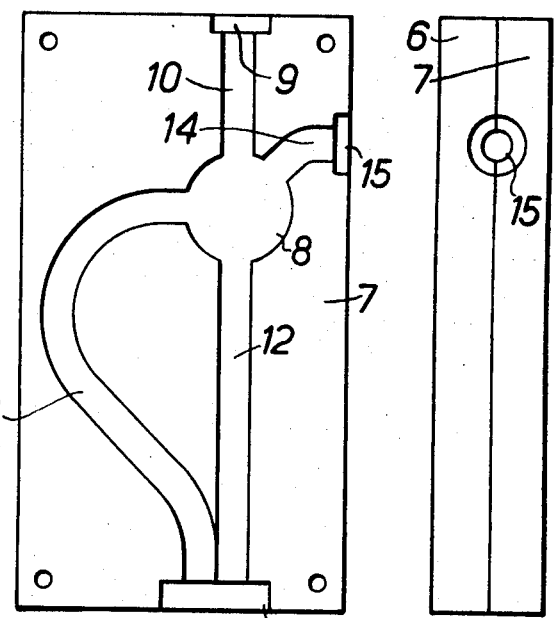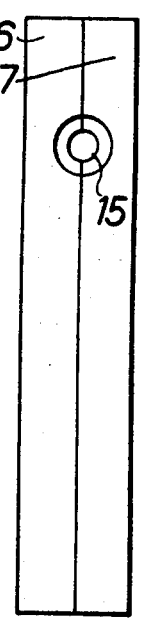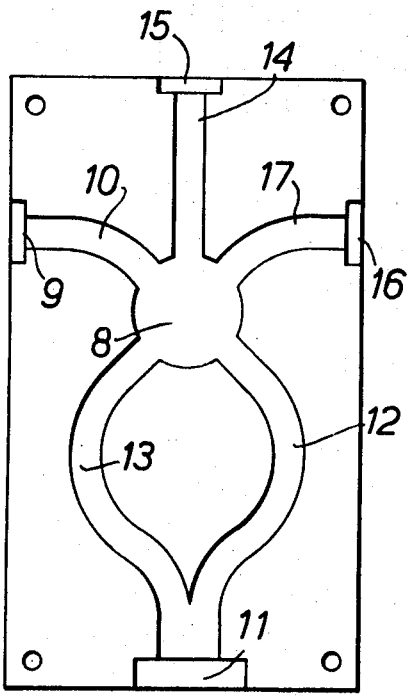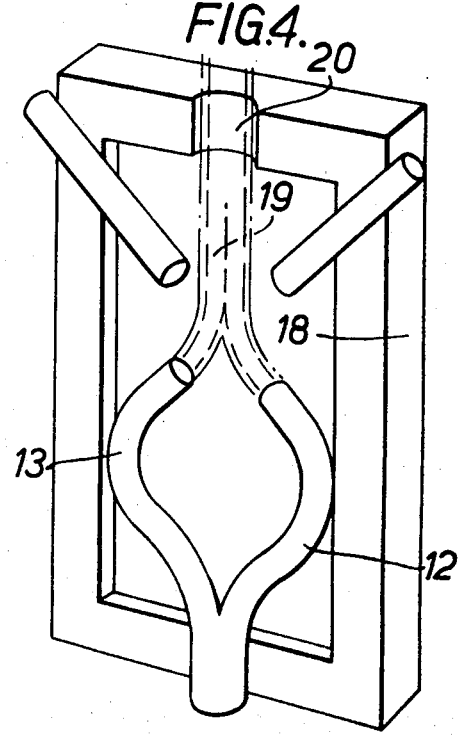

FLUIDIC DIODE

BACKGROUND OF THE INVENTION

A diode of this kind is known from the French Pat. No. 1,391,362. In its general form, this diode consists of a curved main channel into which a lateral channel discharges almost tangentially with the main channel. When a flow of air is injected into the lateral channel, then the air flows without major impact losses into the main channel, and further towards the outlet of this channel. When, on the other hand, a flow of air is conveyed into the element in the opposite direction at this outlet, then this flow follows the main channel, and only a small portion will change direction and penetrate into the lateral channel.

It has been found that, with an element of this type, it is not possible to keep the flow small in the blocking direction without fairly high resistance losses in the through direction.

The purpose of the invention is to provide a fluidic diode whereby the flow of fluid is allowed to pass through in one direction without noticeable pressure loss, and in the other direction can be entirely diverted towards a ventilation channel, and whereby the disadvantages of the well-known diode are avoided.

A fluidic diode of this type, containing a body with a fluid chamber therein and at least one anode reverse input channel discharging with one end into the fluid chamber and running with the other end to the anode connection, and at least one cathode forward input channel running from the cathode connection to the fluid chamber where it discharges into the prolongation of this anode channel as well as a ventilation aperture linking the fluid chamber with the external medium, is according to the invention characterized by the fact that there are several anode channels each of which runs from the anode connection to the fluid chamber, whereby the channels and the ventilation aperture are arranged in such a way vis-a-vis each other that the combined fluid jet which is formed by the confluence of the fluid jets in the fluid chamber when a flow of fluid is conveyed into the element via the anode connection, is carried off via the ventilation aperture without increase in pressure in the cathode channel.

The best way of ensuring that the combined fluid jet is evacuated without pressure increase consists in providing an evacuation channel in the prolongation of the combined jet. Then the passage of this jet through the fluid chamber causes rather a fall in pressure by the fact that air molecules are propelled toward the evacuation channel, and this pressure drop is partially transmitted to the cathode channel.

In French Pat. No. 1,356,292, a fluidic EXCLUSIVE - OR Element (A + B) AB was shown in FIG. 5, consisting of a fluid chamber, two collecting channels which discharge into the fluid chamber with one end, and converge with the other end, two signal input channels which lie in the prolongation of the aforementioned collecting channels, and a ventilation channel. This ventilation channel, however, is orientated in such a way that it can serve for the conveyance of the signal AB, but not for the diversion of the flow which would be injected into the fluid chamber via the collecting channels. In this assembly, this flow could lead to a pressure increase in the input channels.

Summary of the Invention

A fluidic diode comprising a body having a fluid chamber, at least one anode channel which discharges with one end into the fluid chamber, and with the other end running to the anode connection, and at least one cathode channel running from the cathode connection to the fluid chamber and discharging into the prolongation of this anode channel, as well as a ventilation aperture linking the fluid chamber with the external medium, with the characteristic that there are several anode channels, each of which runs from the anode connection to the fluid chamber, whereby the channels and the ventilation aperture are placed vis-a-vis each other in such a way that the combined fluid jet that is formed by the convergence of the fluid jets in the fluid chamber when a fluid flow is conveyed into the element via the anode connection, is carried off via the ventilation aperture without increase of pressure in the cathode channel. In an embodiment according to the invention, the fluidic diode is characterized by at least one extra cathode connection, which is linked with the fluid chamber via an extra cathode channel whereby the outlet of this cathode channel lies in the prolongation of the outlet of one of the anode channels in the fluid chamber.

Various further and more specific purposes, objects features and advantages will clearly appear from the detailed description given below taken in connection with the accompanying drawings which form part of this specification and illustrate merely by way of example embodiments of the devices of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings in which:

FIG. 1 shows a diode in accordance with the status of technique;

FIG. 2a and 2b show a diode in accordance with the invention. In this connection, FIG. 2a gives the configuration of the channels and FIG. 2b a side projection of the element;

FIG. 3 shows a variant whereby two anodes and a common cathode are present;

FIG. 4 shows another model of the invention.

FIG. 1 shows a diode such as is known from said French Pat. No. 1,391,362. It consists of a main channel 1 in which a lateral channel 2 discharges. The cathode and anode connections have been marked respectively with the FIGS. 3 and 4, and the ventilation outlet with the FIG. 5. The outlet 5 runs in the prolongation of the outlet of the lateral channel into the main channel, although the wall of the main channel at the level of the latter outlet does not run parallel with the direction of the lateral channel.

When a flow of fluid is conveyed into the element via the cathode 3, this flow proceeds straight through to the outlet 4. Conversely, however, a flow which penetrates into the element via anode 4 will proceed via the main channel to the ventilation aperture 5. The walls of the main channel conduct the flow, and only a small portion will nevertheless deviate from the flow direction and into the laterial channel (cathode channel). As the latter flow is an undesirable blocking current, the flow resistance of the laterial channel will be made large vis-a-vis that of the main channel. Then, however, the element also shows an undesirably large flow resistance in the through direction and a high fluid consumption in the opposite direction.

The flow of the undesirable blocking current is impeded in accordance with the invention by the fact that the air current which is conveyed in the blocking direction from the anode channel into the fluid chamber does not run in the direction of the cathode channel, as is indeed the case with the diode at present known, while conversely the air current which discharges from the cathode channel into the channel division does indeed flow in the direction of the anode channel. This result is obtained by executing the anode channel in the form of several convergent channels, one of which lies in the prolongation of the cathode channel. The counter-current is split into a number of partial currents which are recombined in the channel division in a direction which is different from that of the cathode channel. The ventilation channel is then placed in the prolongation of the direction of the combined fluid flow.

An element in which this principle has been implemented is shown in FIG. 2. It consists of two small airtight plates 6 and 7, pressed against each other, between which in the contact surface of one of the plates 7 or of both, a number of grooves and recesses are present so that between the two plates there is a configuration of a fluid chamber 8 and a number of channels which discharge into the fluid chamber. The cathode connection 9 is linked with the fluid chamber via the cathode channel 10, and the anode connection 11 is linked with the same fluid chamber via two anode channels 12 and 13. A ventilation channel 14 runs from the fluid chamber to the ventilation aperture 15.

The plates may be made of any suitable material, such as synthetic resin or metal. The grooves and recesses may be introduced into the plates in an arbitrary way, such as by selective etching, milling or casting in a mould. The plates may, for example, also be of aluminium, whereby the configuration is pressed into the plates by means of one or more hard objects. They must be joined to each other in an airtight way. For this purpose, a suitable adhesive and sealing medium may be used; the plates may also be attached to each other by means of screws or other well-known means.

If the cathode connection 9 is brought to high pressure vis-a-vis the anode connection 11, then a current flows through the cathode channel 10 to the fluid chamber 8, where the fluid is injected and absorbed by the anode channel 12 and then to the anode connection 11. The channels 10 and 12 are made sufficiently wide to keep the resistance losses to a minimum.

If, on the other hand, the anode connection 11 is brought to high pressure vis-a-vis the cathode connection 9, then a current flows in via the anode connection and is divided over the two channels 12 and 13. Both partial currents discharge into the fluid chamber 8, collide with each other and form a combined current which is carried off via the ventilation channel 15.

In the example given above, there are two anode channels 11 and 12, but there may also be more anode channels present. However, they must, when the anode connection is at high pressure, supply a number of jets in the fluid chamber which converge into one jet that is not directed towards the cathode channel, but towards the ventilation channel, while the cathode channel always lies in the prolongation of one of the anode channels.

The element may also be provided with several cathode connections. This is shown in FIG. 3, which illustrates an element according to FIG. 2, but with a second cathode connection 16. The elements corresponding to FIG. 2 are indicated with the same reference figure. The extra cathode connection 16 is linked with the fluid chamber via a corresponding extra cathode channel 17 which lies in the prolongation of the anode channel 13. Both the current which is conveyed into the element via cathode 9 and that via cathode 16 (not together), will flow towards the common anode 11. However, the current which is conveyed into the element via this anode is split into two parts in the anode channels 12 and 13 which then flow together again into the fluid chamber according to a direction where the collecting channel 14 is placed.

The invention is not limited to the number of cathode or anode channels, nor to the materials used, nor to the fluid used, nor again as regards the models. Thus, for example, the elements may, instead of being executed between two small plates in a two-dimensional configuration, be executed by a combination of small pipes. FIG. 4 shows an example of this. A closed case 18 surrounds a space and is pierced through by anode and cathode pipes. Only one half of the case is drawn so as to be able to present the inside of the element. The small pipes are assembled vis-a-vis each other according to the same principles as the channels in the former examples. Only there is no ventilation channel, so that the combined fluid jet 19 formed by the two fluid jets flowing out of the two anode pipes 12 and 13 flows freely outside via the ventilation aperture 20. This jet carries air molecules along with it which could be supplied, inter alia, via a cathode pipe. In other words, the cathode pipe does not expel any air (undesirable blocking current), but even takes it in. If necessary, this can be avoided by choosing a sufficiently large ventilation aperture so that backflow would be possible, or by not placing this ventilation aperture, or not placing it altogether, in the prolongation of the combined air flow. In this way, a slight overpressure exists, offsetting the low pressure referred to above.

While the invention has been described and illustrated with respect to certain preferred embodiments which give satisfactory results, it will be understood by those skilled in the art after understanding the principle of the invention, that various changes and modifications may be made without departing from the spirit of the invention.

What is claimed is:

1. A fluidic diode comprising, in combination, a body base having a fluid chamber; at least one reverse input channel means discharging at one end into said fluid chamber; a reverse input connection on said body base and communicating with the other end of said reverse input channel means; at least one forward input channel communicating with said fluid chamber and discharging into said reverse input channel means; a forward input connection on said body base and communicating with said forward input channel, said forward input channel extending between said forward input connection and said fluid chamber; ventilation aperture means linking said fluid chamber with the exterior of said body base, fluid means conducted in the interior of said body base through said reverse input connection and admitted into said fluid chamber, said fluid means being conducted from said fluid chamber through said ventilation aperture means without increase in pressure in said forward input channel, said reverse input channel means comprising a plurality of reverse input channels extending between said reverse input connection and said fluid chamber, said reverse input channels and said ventilation aperture means being spaced relative to each other so that a combined fluid jet is formed in said fluid chamber from fluid flow through said reverse input channels, fluid flow from said reverse input channels converging in said fluid chamber, said combined fluid jet being conducted from said fluid chamber through said ventilation aperture means without increase in pressure in said forward input chamber.

2. The fluidic diode as defined in claim 1, wherein said forward input channel discharges into an extension of said reverse input channel means.

3. The fluidic diode as defined in claim 1 including at least one further forward input connection on said body base; at least one further forward input channel linking said further forward input connection with said fluid chamber, said further forward input channel having an outlet lying in an extension of the outlet of one of said reverse input channels in said fluid chamber.

4. The fluidic diode as defined in claim 1, wherein said body base is a two-part assembled housing.

5. The fluidic diode as defined in claim 1, wherein said body base comprises an enclosed case.

6. The fluidic diode as defined in claim 1 including a ventilation channel linking said ventilation aperture means with said fluid chamber.

7. The fluidic diode as defined in claim 6, wherein said ventilation channel is directed along the path of said combined fluid jet.

8. The fluidic diode as defined in claim 1, wherein said body base comprises two plates secured to each other.

9. The fluidic diode as defined in claim 8, wherein said plates are of plastics.

10. A fluidic diode comprising, in combination, a body base having a fluid chamber; a forward and a reverse input connection on said body base; ventilation aperture means linking said fluid chamber with the exterior of said body base; a plurality of reverse input channels extending between said reverse input connection and said fluid chamber; and at least one forward input channel communicating with said forward input connection and discharging into said plurality of reverse input channels, whereby said reverse input channels and said ventilation aperture means are so spaced relative to each other, that fluid supplied to said reverse input connection and flowing through said reverse input channels converges in said fluid chamber into a combined fluid jet which is conducted through said ventilation aperture means without substantial increase in pressure in said forward input channel.

* * * * *